United States Patent [19]

Hempel

[11] Patent Number: 5,049,331
[45] Date of Patent: * Sep. 17, 1991

[54] METHOD OF MANUFACTURING A THREAD-REINFORCED, EXTRUDED RUBBER BODY

[75] Inventor: Jürgen Hempel, Weinheim, Fed. Rep. of Germany

[73] Assignee: Firma Carl Freudenberg, Weinheim an der Bergstrasse, Fed. Rep. of Germany

[*] Notice: The portion of the term of this patent subsequent to Apr. 18, 2003 has been disclaimed.

[21] Appl. No.: 443,214

[22] Filed: Nov. 28, 1989

[30] Foreign Application Priority Data

Feb. 16, 1989 [DE] Fed. Rep. of Germany ....... 3904588

[51] Int. Cl.⁵ .............................................. B29C 47/24
[52] U.S. Cl. ..................... 264/103; 264/173; 264/174; 264/209.2; 264/209.6; 264/236; 264/312; 425/113; 425/381; 425/382.3
[58] Field of Search ............... 264/103, 173, 174, 312, 264/209.2, 209.6, 236; 425/113, 114, 382.3, 381, 380, 501

[56] References Cited

U.S. PATENT DOCUMENTS

| | | | |
|---|---|---|---|
| 2,563,397 | 8/1951 | Colombo | 425/113 |
| 2,800,683 | 7/1957 | Teichmann | 425/113 |
| 3,289,251 | 12/1966 | Daubenfeld | 425/380 |
| 3,303,251 | 2/1967 | Heider et al. | 264/173 |
| 3,405,426 | 10/1968 | Donald | 425/381 |
| 3,856,447 | 12/1974 | Schiesser | 425/114 |
| 4,100,240 | 7/1978 | Bassani | 264/173 |
| 4,671,761 | 6/1987 | Adrian et al. | 425/501 |
| 4,822,548 | 4/1989 | Hempel | 425/381 |

FOREIGN PATENT DOCUMENTS

| | | | |
|---|---|---|---|
| 1146300 | 11/1957 | France | 425/113 |
| 56-86718 | 7/1981 | Japan | 264/174 |

*Primary Examiner*—Jeffery Thurlow
*Attorney, Agent, or Firm*—Felfe & Lynch

[57] ABSTRACT

A method of producing a thread-reinforced, extruded rubber body by a shear head wherein the threads are continuously supplied, embedded in a rubber mixture which is in a continuous forward motion and fixed in the rubber body by vulcanizing the rubber mixture. The method is such that the reinforcing threads are helically twisted in the finished rubber body. The rubber body is thus reinforced not only in longitudinal direction but also additionally in circumferential direction.

4 Claims, 2 Drawing Sheets

METHOD OF MANUFACTURING A THREAD-REINFORCED, EXTRUDED RUBBER BODY

BACKGROUND OF THE INVENTION

The invention relates to a method of manufacturing a thread-reinforced, extruded rubber body by means of a shear head wherein the threads are continuously supplied, embedded in a rubber mixture which is in a continuous forward motion and fixed in the rubber body by vulcanizing the rubber mixture.

In the method of U.S. Pat. No. 4,671,761 the threads are embedded in the rubber mixture by means of a nozzle which is disposed downstream of the actual shear head. The individual parts of the nozzle are associated with each other in such way that they cannot be rotated. The threads are thus always parallel to each other and extend in direction towards the rubber body. In certain cases of application this is not fully satisfactory.

It is hence an object of the invention to further develop a method of this general kind such that the reinforcing threads are helically twisted in the finished rubber body.

In the method in accordance with the invention, the continuously fed threads are embedded in the continuously supplied rubber mixture which is instantaneously contained in the continuously rotating shear mandrel disposed in the shear head through orifices of this shear mandrel which are distributed in circumferential direction and extend through the front surface.

The speed of the forward motion of the rubber mixture is adjusted to the rotating speed of the shear mandrel in such a way that while the threads are embedded the rubber mixture approaches the lowest possible flow viscosity. The threads are thus on all sides exposed to the liquid medium which creates an excellent adhesive attaching in the final rubber body. In addition, they follow the rotating movement of the shear mandrel while being embedded in the rubber mixture. This causes the threads to be twisted around a common axis and helically extend through the final rubber body. The latter is thus reinforced not only in longitudinal direction but also additionally in circumferential direction, a fact which permits, for example, using the rubber body as ropes or the inside of ropes or as other form bodies which are exposed to a bending stress.

The threads can be made of any commercially available and used material, for example, natural, artificial or metallic textile threads. The use of mixtures thereof and embodiments consisting of several threads is also possible.

Inside the shear head the rubber mixture used is subject to a flexing caused by the relative twisting of the shear head in respect to the casing. When the rotating speed of the shear head increases, this flexing stress causes the temperature of the mixture used to rise. Hence, a heating up to vulcanization temperature is therefore possible without problems even in case of high rotational speeds. The vulcanization and the so caused hardening, however, do not automatically result when reaching the vulcanization temperature; this result is achieved only after a temporary, significant reduction of the flow viscosity of the mixture used during the beginning cross-linking reaction of the mixture which then causes the hardening. The different stages are clearly distinct from one another. This fact is used in accordance with the invention so as to embed the threads into the mixture at a time when the flow viscosity is as low as possible. This ensures a best possible incorporation of the threads in the rubber body so as to impart a best possible strength on the latter.

Advantageously, the retention time of the rubber mixture on the shear head is measured such that upon exiting through the orifice of the shear head the mixture is at least in an advanced stage of vulcanization. The position of the embedded threads can hence not be changed anymore. The possibly required vulcanization to completion can be carried out without problems in a tempering chamber.

Before introducing the threads into the shear head they can be twisted against the rotational sense of the shear mandrel. This is particularly advantageous when the threads are composed of different partial threads. The resulting reinforcement inside the finished rubber body is configured like a crosslaid rope. This imparts to the form body an excellent form resistance when the latter is exposed to tensile or bending stress.

While being introduced in the shear head, the threads can be subject to braking which can be carried out, for example, by means of a friction device. In this case, they are subject to an internal prestress inside the finished rubber bodies which further improves the dimensional stability thereof.

Through a concentric auxiliary opening which extends through the front side of the shear mandrel a preform can be continuously fed to the shear head. Generating an adhesive bonding in the aforesaid way this preform is jacketed by rubber bodies which are produced according to the aforesaid description. The number of layers successively disposed in radial direction can be freely selected and is determined only by the use of the rubber body.

In a correspondingly, in successive stages, and in a multiple, layers-produced rubber body, it is possible to change the rotational sense of the shear mandrel for each new layer. The layers of threads which successively follow one another in radial direction are associated with one another in a crosswise relationship. A dimensional stability is thus imparted to the rubber body.

In cases when the winding direction of the successive thread layers in the successive layers is the same, the finished rubber body has a comparatively greater elasticity. This makes it more suitable for cases when subject to shock stress during the intended use. Best possible properties are achieved in this case when the rubber mixture used simultaneously exhibits a high internal damping. This simultaneously suppresses vibrations, which can be caused in the rubber body by secondary effects when used in certain cases.

With regard to a strong mutual adhesion, it has proven itself to use like rubber mixtures for producing both the preform and the individual rubber layer. These mixtures are only prevulcanized before embedding the respective thread layer and the vulcanization is completed only after the final molding of the rubber body takes place. A tempering chamber can hence be used which reduces the occupation time of the shear mandrel and further improves the economical efficiency of the process in accordance with the invention. In addition, the layers successively disposed in radial direction are perfectly bonded to one another which, in turn, results in a correspondingly significant mechanical strength.

The rubber bodies obtained with the method in accordance with the invention can also be embedded in rubber mixtures before completing the vulcanization and be further manufactured to differently shaped form bodies; vulcanization can then be completed in a common process with the new bodies. With respect to the way of incorporating the reinforcing threads, the resulting reinforcing effect is significantly improved.

A particular advantage of the form parts obtained through the method in accordance with the invention is that the complete embedding of the reinforcing threads in the rubber mixture protects the threads from environmental effects in an excellent way. An exposure of the threads to corrosion is thus excluded as far as possible. Even steel wires can be used without problems for the manufacture of thread-reinforced, extruded rubber bodies which are employed in ropes used in a wet environment.

SUMMARY OF THE INVENTION

In accordance with the invention, a method of producing a thread-reinforced, extruded rubber body by means of a shear head wherein the threads are continuously supplied, embedded in a rubber mixture which is in a continuous forward motion, and fixed in the rubber body by vulcanizing the rubber mixture, comprises continuously embedding threads from orifices of a rotating shear mandrel which extend through a front surface and are distributed in circumferential direction of the shear mandrel which is in a shear head and in a continuous motion in a part of the rubber mixture contained in the shear head. The method also includes adjusting the speed of the forward motion of the rubber mixture to the rotating speed of the shear mandrel such that the rubber mixture at least approaches its lowest-possible viscosity during the embedding of the threads.

For a better understanding of the invention, together with other and further objects thereof, reference is made to the following description, taken in connection with the accompanying drawings, and its scope will be pointed out in the appended claims.

BRIEF DESCRIPTION OF THE DRAWINGS

Referring now to the drawings.

DESCRIPTION OF THE PREFERRED EMBODIMENT

Figure 1:
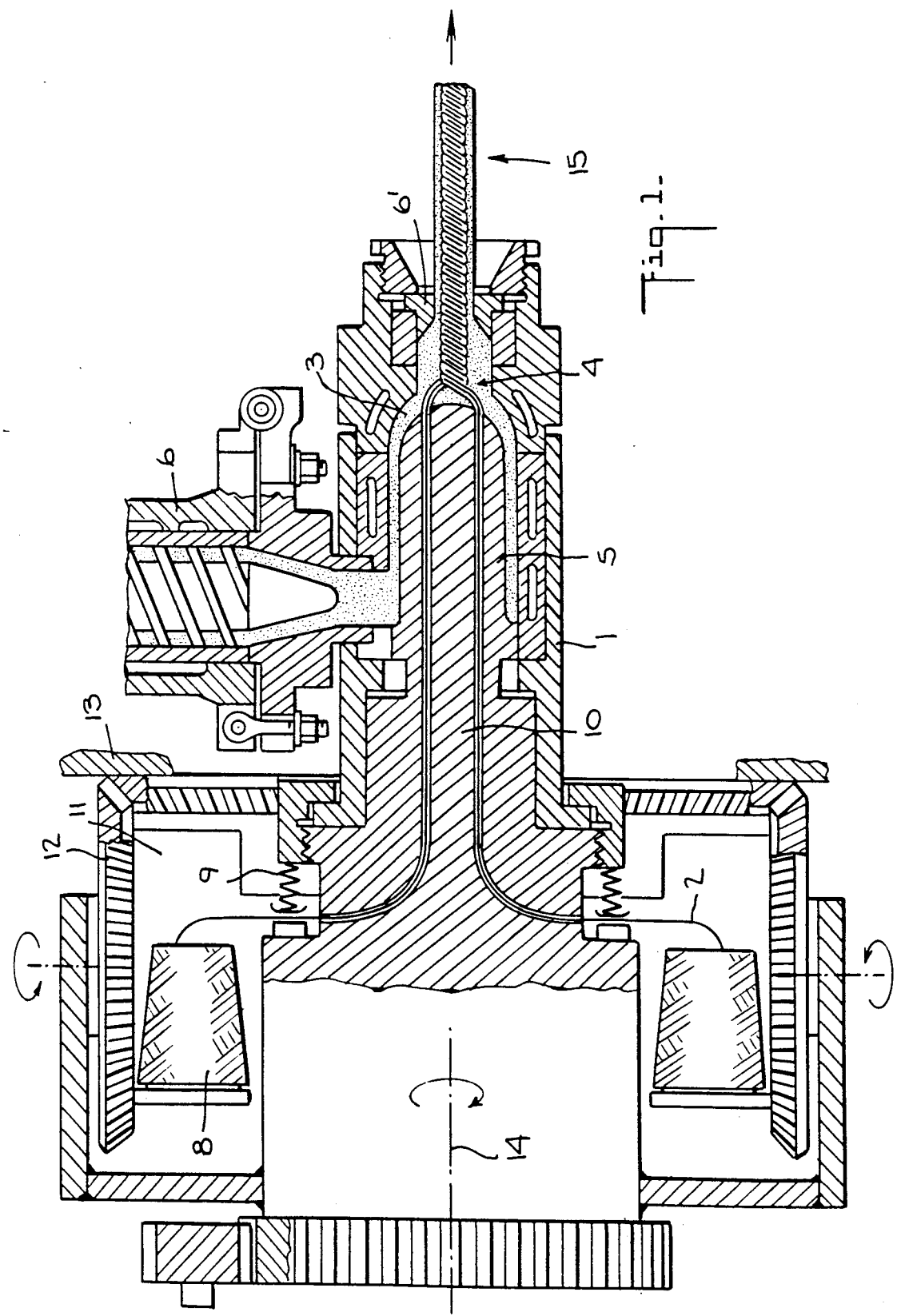
FIG. 1 is a first device for carrying out the method in accordance with the invention.

The shear head shown in FIG. 1 serves to manufacture a thread-reinforced, extruded rubber body in accordance with the aforesaid method. It includes a casing 1 which is attached in front of the outlet opening of an extruder 6. A form nozzle 6' is disposed in the casing 1 as is an independently driven shear mandrel 5 which can rotate around its own axis and which is coaxially associated with the form nozzle 6'.

In the left portion of the drawing, the shear mandrel 5 is provided with coils 8 which follow its rotating movement and from which the threads 2 can continuously be taken off and introduced into the thread guide 10 of the shear mandrel passing over a friction device 9. In the vicinity of their diameter which radially extends toward the exterior, the containers 11 which hold the coils 8 are attached to a truncated conical gear wheel 12 which engages with a non-moving toothed ring 13.

During the rotational movement of the shear mandrel 5, the coils 8, hence, do not only move around the axis 14 but additionally in the direction of the arrows indicated around the axis of the conical gear wheel 12. The threads 2 are thus twisted around their own axes in an opposite sense to the rotational sense of the shear mandrel 5. This sense is also indicated by an arrow.

In the area where the thread enters the shear mandrel, the threads 2 are subject to the effects of the friction device 9. This causes a tensile stress to be effective in the threads while the latter are embedded in the rubber mixture which forms the rubber body.

The thread guide includes a number of boreholes which are distributed in circumferential direction and the orifices 4 of which extend through the front surface of the shear mandrel. The threads exiting through the orifices 4 thus follow the rotational movement of the shear mandrel 5 which causes a twisting around axis 14 in the way as shown for 15. The speed of the forward motion of the rubber mixture 3 is adjusted to the rotating speed of the shear mandrel 5 in such a way that the rubber mixture at least approaches the lowest-possible flow viscosity when the threads are embedded and particularly at the time when the threads exit the orifices 4. The conveying speed of the extruder 6 decisively determines the forward motion of the rubber mixture. Independent from the rotating speed of the shear mandrel 5, this conveying speed can be changed and adjusted to a value which ensures that the aforementioned value of speed of the forward motion of the rubber mixture 3 is observed. Using a sample, this value can be monitored based on the quality of the embedding of the threads in the finished rubber body and can be corrected as required.

Basically it is possible to select the method speed such that the thread-reinforced rubber body which exits the form nozzle 6 is present in a completely vulcanized form for immediate use as intended. From an economical point of view a method is preferred, as opposed to this, wherein the vulcanization of the rubber mixture within the shear head 1 is measured such that the pre-vulcanization is just completed which ensures a stability of the rubber body exiting through the form nozzle sufficient for storage and transport. The rubber body can subsequently be introduced in a tempering chamber and exposed to the effects of higher temperature until vulcanization is completed. The mechanical properties of a so obtained rubber body do not essentially differ from the aforesaid bodies which were completely vulcanized in the shear head.

Figure 2:
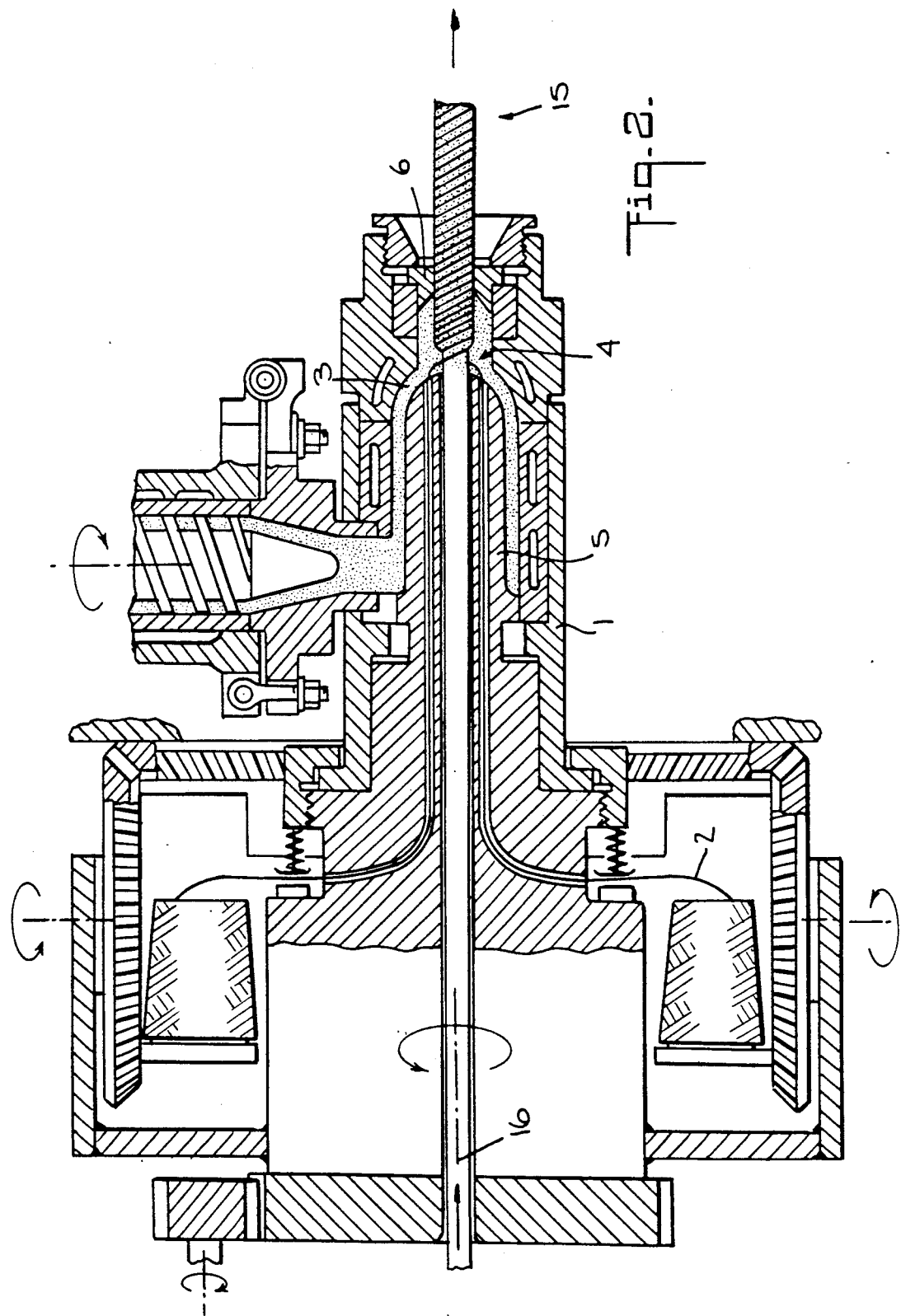
FIG. 2 is a second device for a modified application of the method in accordance with the invention.

The device shown in FIG. 2 is used for a modified application of the method, in accordance with the method. Different from the shear mandrel shown in FIG. 1, an embodiment is used which is concentrically penetrated by an auxiliary opening. It serves to continuously feed the preform 16 which can be produced according to the aforesaid method while employing the device as shown in FIG. 1. Referred to the rotational sense and speed of the shear mandrel 5, it has a different rotational sense and/or speed. The preferred rotational speed is 0. The orifice of the auxiliary opening radially penetrates the front side of the shear mandrel 5 inside the orifices of the thread guides. The threads 2 which exit through the orifices 4 during the intended use of the device are thus continuously enclosed by the rubber mixture and are helically wound up on the external circumference of the preform 16. In this case, a rotational sense according to FIG. 2 is used which is opposed to the rotational sense of the shear mandrel 5 as shown in FIG. 1 such that the reinforcing threads are wound up in a direction opposed to the one of the previously produced layer. With regard to form stability of the rubber body obtained after complete vulcanization, the significance of such a crosswise succession of individual layers must be pointed out. The vulcanization is advantageously completed according to the aforesaid description separate from the device shown in FIG. 2 in a separate tempering chamber.

It is understood that the coating of the preform shown in FIG. 2 can be repeated as many times as desired. For this purpose, only the use of shear mandrels 5 and form nozzles 6' is required which are correspondingly expanded with respect to the available openings. When larger diameters are used the number of the orifices 4 distributed on the circumference of front surface of the shear mandrel 5 will be increased correspondingly so as to obtain the desired thread density within the reinforcement. In case there are no threads running through some of the orifices this does not adversely effect the reinforcing of threads in the area of adjacent orifices where the threads exit.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method of producing a thread-reinforced, extruded rubber body by means of a shear head wherein the threads are continuously supplied, embedded in a rubber mixture which is in a continuous forward motion, and fixed in the rubber body by vulcanizing the rubber mixture, comprising: continuously embedding threads coming from orifices of a rotating shear mandrel which extend through a front surface and are distributed in circumferential direction of the shear mandrel which is in a shear head and in a continuous motion in a part of the rubber mixture contained in the shear head; and adjusting the speed of the forward motion of the rubber mixture to the rotating speed of the shear mandrel such that the rubber mixture at least approaches its lowest-possible viscosity during the embedding of the threads.

2. A method in accordance with claim 1, which comprises determining the retention time of the rubber mixture in the shear head such that the rubber mixture is in an advanced stage of vulcanization when exiting a form nozzle.

3. A method in accordance with claim 1, which comprises, before introduction into the shear mandrel, twisting the threads in themselves against the rotating sense of the shear mandrel.

4. A method in accordance with claim 1, which includes braking the threads when introducing the threads into the shear mandrel.

* * * * *